May 28, 1946. F. HERZEGH 2,400,930
BEAD LOCK
Filed May 29, 1942 2 Sheets-Sheet 1
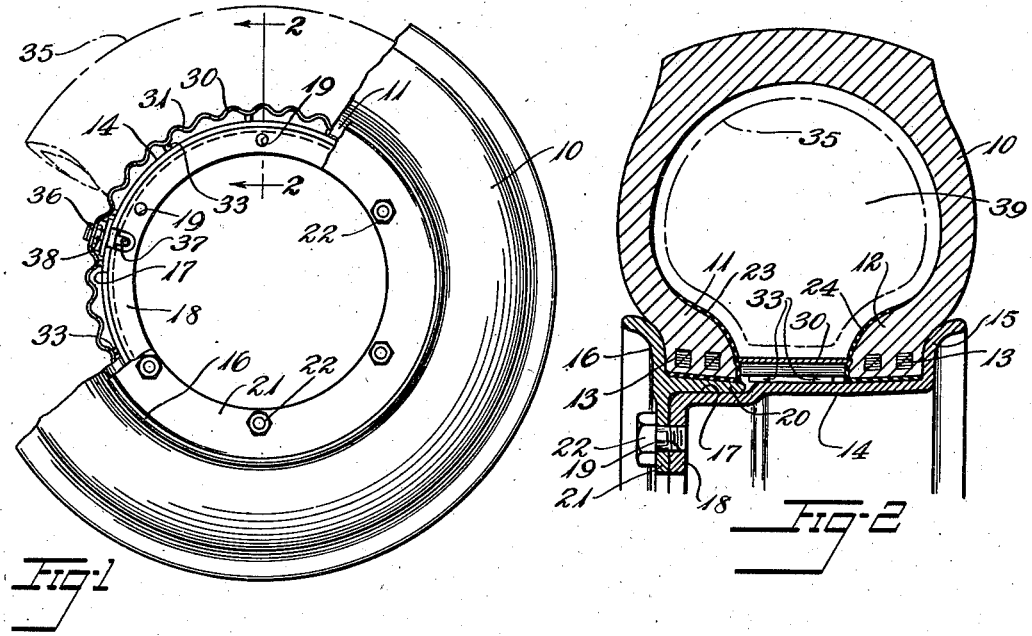
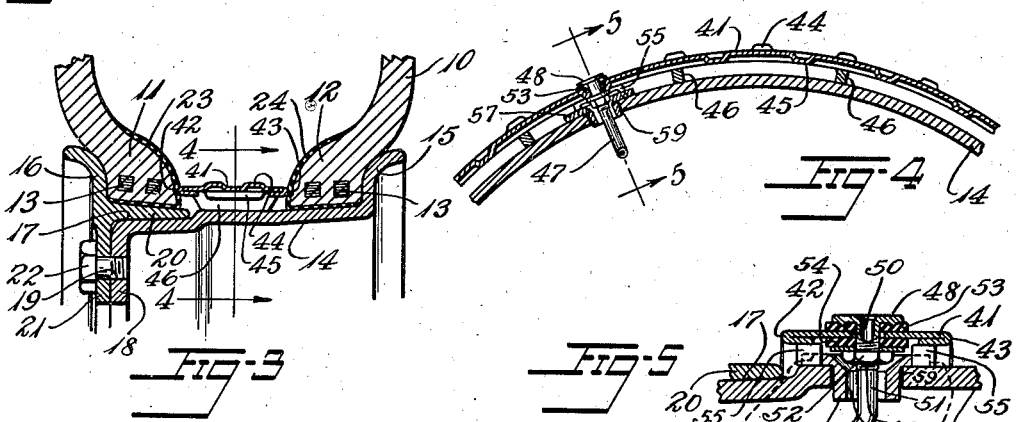
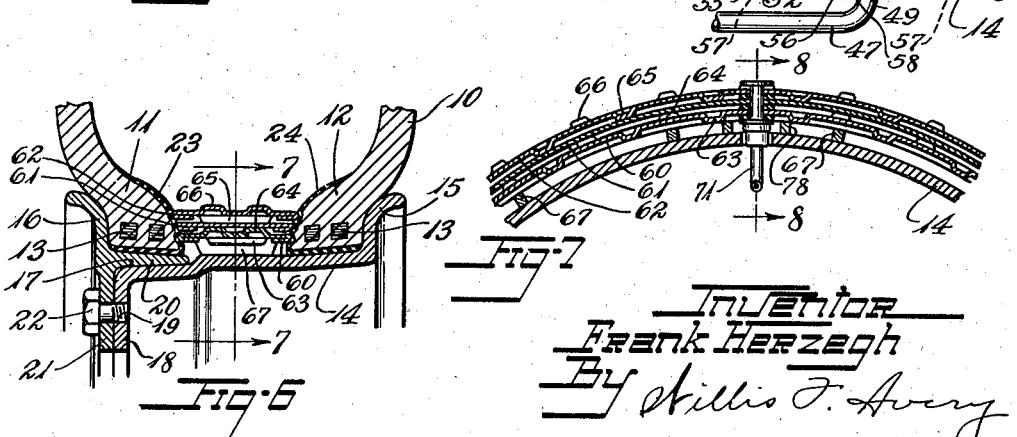
Inventor
Frank Herzegh

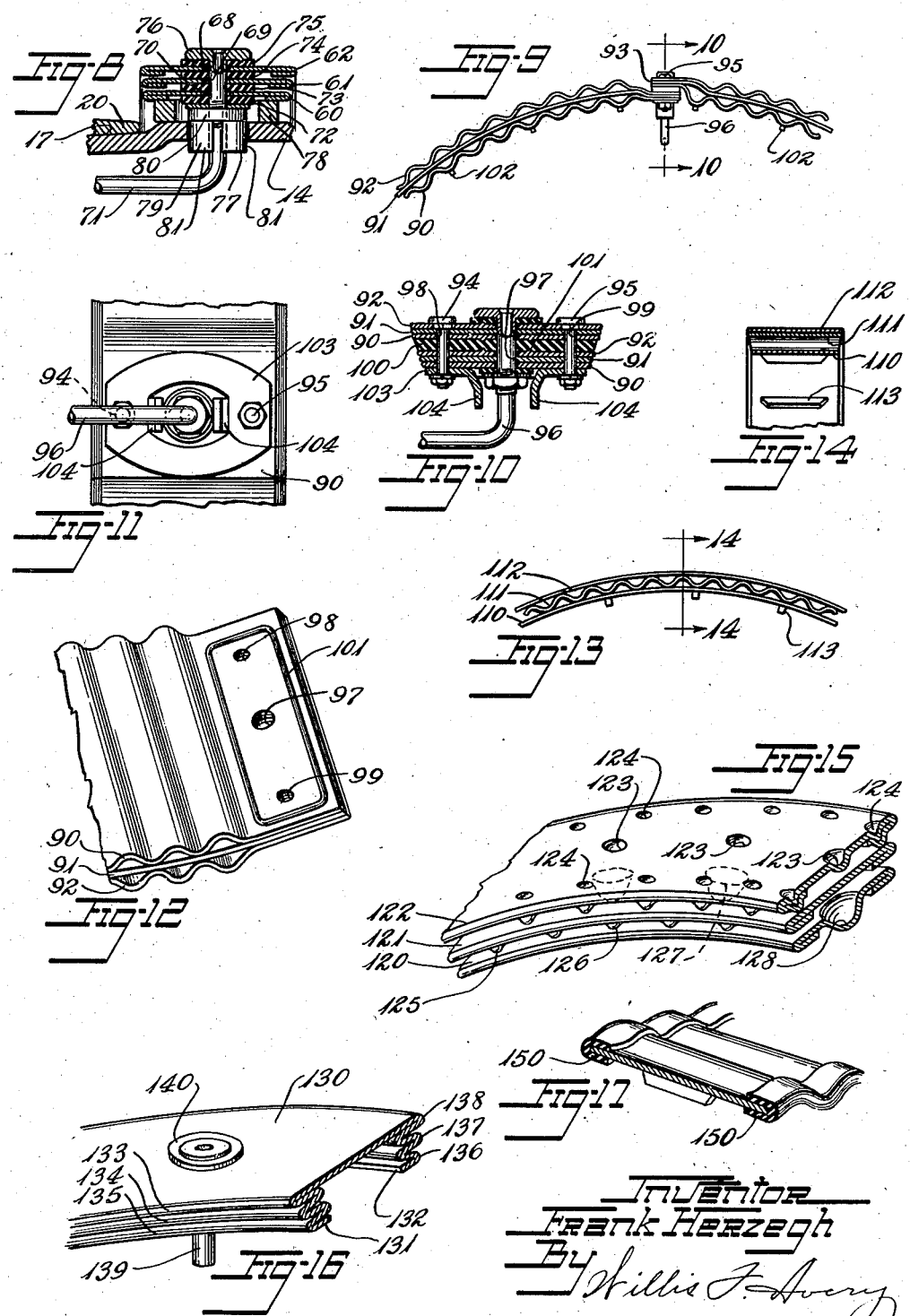

Patented May 28, 1946

2,400,930

UNITED STATES PATENT OFFICE 2,400,930

BEAD LOCK

Frank Herzegh, Shaker Heights, Ohio, assignor to The B. F. Goodrich Company, New York, N. Y., a corporation of New York Application May 29, 1942, Serial No. 444,966

17 Claims. (Cl. 152—400)

This invention relates to locking structure for securing the bead portions of a tire in place on a wheel rim, and the invention provides a bead locking structure that is capable of maintaining an air tight seal across the bead portions of the tire.

It is desirable in some vehicles to lock or clamp the bead portions of pneumatic tire casings to the supporting wheel rim to prevent rotational shifting of the tire in use and to prevent the tire from leaving the rim in case of deflation of the tire. In order that the locking device may fit within the inextensible bead portions of the tire and be so installed, provision for temporarily reducing the diameter of the device is required if it is to be in the nature of a band.

The principal objects of the invention are to provide bead locking means satisfying these and other requirements in an effective manner, to provide effectively for lateral rigidity with circumferential flexibility in the bead locking structure, to provide air tight sealing of the tire casing such as to eliminate the necessity of employing an inner tube, to provide reliable sealing of the tire casing together with security in holding the casing against accidental displacement, to provide maximum lateral stiffness of the locking structure with minimum weight, to provide for convenience of manufacture and assembly, and to provide for safety in operation.

These and other objects will appear from the following description and the accompanying drawings.

Of the drawings:

Fig. 1 is a side elevation of a tire casing and its securing rim and a bead locking structure constructed according to and embodying the invention, parts being broken away, the position of the inner tube, when used, being indicated in broken lines.

Fig. 2 is a sectional view, taken along line 2—2 of Fig. 1, the position of the inner tube, when used, being indicated in broken lines.

Fig. 3 is a view like Fig. 2, but showing a modification of the bead locking structure, parts being broken away.

Fig. 4 is a central sectional view of the bead locking structure of Fig. 3, taken along line 4—4 of Fig. 3, parts being broken away.

Fig. 5 is a sectional view, taken along line 5—5 of Fig. 4 showing the valve connection, parts being broken away.

Fig. 6 is a view like Fig. 2, but showing a further modification of the bead locking structure, parts being broken away.

Fig. 7 is a central sectional view, taken along line 7—7 of Fig. 6, parts being broken away.

Fig. 8 is a sectional view, taken along line 8—8 of Fig. 7 showing the valve connection.

Fig. 9 is a side elevation of a still further modification of the bead locking ring, parts being broken away.

Fig. 10 is a sectional view of the embodiment of Fig. 9, taken along line 10—10 thereof, showing the splice and the valve connection.

Fig. 11 is a detail view showing the inner face of the structure of Fig. 9 at the splice, parts being broken away.

Fig. 12 is a perspective view of one of the ends of the bead locking ring of Fig. 9.

Fig. 13 is a side elevation of a still further modification of the bead locking ring, parts being broken away.

Fig. 14 is a sectional view taken along line 14—14 of Fig. 13.

Fig. 15 is a perspective view of a portion of a still further modified annular locking ring embodying the invention, parts being broken away.

Fig. 16 is a perspective view of a portion of still another modified annular bead locking ring embodying the invention, parts being broken away away.

Fig. 17 is a perspective view of a portion of a still further modification.

In accordance with the invention an endless, circumferential flexible, and laterally stiff annulus, which may comprise a plurality of layers of sheet metal adapted to float on each other, are placed between the bead portions of the tire casing and are provided with rounded thin edges adapted to engage the bead portions under pressure applied by lateral compression of the rim. One or more of the layers may be of corrugated or other suitably indented form to increase flexibility circumferentially and increase stiffness laterally thereof and to provide a broader extent radially of overall bearing of the edges thereof on the tire casing. The invention further makes possible an effective air tight sealing of the tire casing such that the necessity for an inner tube is avoided.

Referring to the drawings, which illustrate embodiments of the invention, the numeral 10 designates a tire casing having bead portions 11, 12 reinforced by bead cores 13 and adapted to be seated on a channel rim 14. The rim is of the circumferentially split type, having a fixed rim flange 15 at one side thereof, and a laterally removable rim flange ring 16 at the opposite side. The rim 14 is formed with a rabbeted seat 17 for centering and supporting the removable flange ring, and an inwardly directed flange 18 thereon having spaced-apart threaded openings 19. The removable flange ring 16 has an axially directed flange 20 adapted to be seated on the rabbeted seat 17 and to support the tire casing, and a radially directed flange 21 formed with clearance apertures in alignment with the threaded openings 19 to receive tap bolts 22 for holding the flange ring in place and for clamping the bead portions of the casing against the bead locking ring as hereinafter described.

Referring to the embodiment of Figs. 1 and 2, for clamping the bead portions of the tire casing 10 between the rim flanges against relative circumferential and lateral movement, especially when the tire is deflated, a bead locking ring 30 of sheet metal, formed with axially disposed corrugations 31, is located about the rim 14 and between the bead portions 11, 12. The bead locking ring is made wider than the space between the bead portions so as to compress the bead portions axially of the rim when the tap bolts 22 are screwed in place. The edges of the bead locking ring are thin but are rounded so as not to cut the rubberized fabric material or the rubber facing of the bead portions under considerable pressure sufficient to embed them somewhat into the material of the bead portions. In order to space the bead locking ring well above the toe of the bead portions, preferably in line approximately with the stiff bead cores, spacers 33 may be provided at intervals about the inside of the ring for contact with the floor of the rim. These may be formed by embossing the sheet metal of the ring, in spaced-apart dimples at the valleys of the corrugations, or spacing blocks may be riveted or welded to the sheet metal for this purpose if desired.

Where an inner tube 35 is employed the bead locking ring may be perforated at one position 36 for receiving the usual valve stem 37 and a lock nut 38 threaded on the valve stem may be clamped against the ring, the arrangement being such that the inner tube is clamped about the valve stem to the ring. I have discovered, however, that efficient sealing of the air cavity 39 of the casing may be provided by the bead locking ring of this invention without an inner tube, as the thin rounded edges of the metal annulus may be pressed into the inner faces of the bead portions of the tire so as to seal the air cavity even at high fluid pressures while effective locking is at the same time provided.

The axial corrugations stiffen the bead lock laterally and provide a bearing surface radially distributed for stable support against tipping. For additional security of sealing, the inner faces of the bead portions of the tire casing may be formed with surface layers 23, 24 of vulcanized soft rubber to act as a sealing gasket. Optionally, the edges of the metal band may be covered with material 150 (Fig. 17) of metal, plastic or other suitable material, but preferably rubber to serve as a gasket for assuring a tight seal.

When no inner tube is employed the valve stem 37 is inserted in the aperture 36 with rubber washers at each face of the bead locking ring and clamped against the ring by the clamp nut 38, the washers sealing the joint. Even when an inner tube is employed, in case of puncture the bead locks prevents relative rotation of the casing and rim and air escape is only possible at the puncture opening in the casing so that air escape is relatively slow and may be cut off completely by misalignment of the puncture openings in the casing and the tube wall caused by slight shifting of the tube wall.

The bead lock also permits use of the tire casing without air when the sidewalls of the casing are sufficiently stiff to support the load without excessive collapse under load.

The corrugated arrangement of the material of the bead locking ring of this embodiment permits some stretch of the ring to accommodate variations in rim dimensions and provides additional flexibility to facilitate distortion of the ring to elliptical form for placement and removal within and from the bead portions of the casing which are of smaller diameter than the ring, and permits use of relatively thin and light weight sheet metal, thereby keeping the unsprung weight of the vehicle low.

In the embodiment of the invention illustrated in Figs. 3 to 5 inclusive, the construction of the tire casing and that of the rim structure is the same as that heretofore described. The bead locking ring 41 is a single annulus of sheet material having its rounded sealing margins 42, 43 formed by doubling its margins, the metal being preferably folded closely upon itself to present a thin but rounded edge. Lateral stiffness of the annulus is increased by embossing the metal between the double margins so as to form laterally elongated stiffening protuberances 44 at spaced-apart intervals therealong, the protuberances 45 extending radially inward and protuberances 44 extending radially outward, and the outward and inward protuberances being arranged in staggered relation.

To provide for spacing the bead locking ring from the rim so that the edges of the ring will be disposed at the zone of the bead portions of the casing having the stiff cores, spacing blocks 46 may be welded or riveted on the under side of the ring at spaced-apart intervals or the protuberances 45 may be formed deep enough to engage the rim.

With this embodiment of the invention, the thin, rounded margins of the bead locking ring contact each bead portion of the tire wall above the toe of the bead portion and along a path concentric with the rim. The length of the sealing zone is reduced from that of the embodiment of Figs. 1 and 2, so that penetration of the bead portions for sealing is obtained with less clamping pressure. The valve stem 47 may be secured directly to the bead locking ring, and for this purpose the valve stem, which may be of bent form, as shown in Fig. 5, has a head 48, a threaded portion 49 adjacent thereto extending through an aperture 50 of the ring and an unthreaded neck portion 51 of reduced size. A nut 52 engages the threaded portion of the stem and clamps the ring against the head 48, rubber sealing washers 53, 54 being inserted between the head 48 and the bead lock and between the nut 52 and the bead lock to seal the joint.

Metal lugs 55 are welded to the inside of the bead locking ring adjacent aperture 50 and a thimble 56 is adapted to clear the valve stem and has notched flanges 57 adapted to receive lugs 55, and a hollow shank 58 adapted to engage in a slot 59 formed through the rim axially from the side thereof supporting the removable flange. The thimble 56 clears the valve stem and by engagement with lugs 55 retains the bead locking ring and the rim in non-rotative relation with respect to each other, relieving the valve stem of direct stress.

In the embodiment of the invention illustrated in Figs. 6 to 8, the tire and rim are of the same construction as those shown in Figs. 1 and 2. The bead locking and sealing member comprises a plurality of superimposed annuli 60, 61, 62, which for better accommodation to the sloping walls of the bead portions, may be of progressively increasing widths radially outward, which member is mounted about the rim between the bead portions of the tire casing. Each annulus has thin rounded margins for sealing against the inner faces of the bead portions, preferably formed by folding the metal closely upon itself circumferentially of the band. The innermost annulus 60 has stiffening protuberances 63 on its inner surface and stiffening and spacing protuberances 64 on its outer face, formed preferably by embossing the metal. The second annulus 61 may be unembossed and rests on the protuberances 64. The third annulus 62 has protuberances 65 on its inner face which rest on annulus 61, and stiffening protuberances 66 on its outer face, formed preferably by embossing the metal. The innermost annulus 60 is spaced from the rim 14 by spacing blocks 67 which are carried by the annulus. These may be riveted or welded to the band or may be embossed from the metal of the band.

Each annulus is made somewhat wider than the normal space between the bead portions so as to be forced into the bead portions when the tap bolts 22 are drawn up, and each annulus is free to slide laterally with respect to the others to accommodate variations in the sidewalls of the bead portions of the tire, providing three annular sealing surfaces at each bead portion. A triple seal is thus provided which increases the security of the seal, and the independency of the bands to flex provides the distortability of the ring necessary to introduce it conveniently within the bead portions of lesser diameter.

At the valve location, each annulus is apertured, as at 68, 69, 70, to clear the valve stem 71. Rubber sealing washers 72, 73, 74, and 75 encompass the valve stem between the bead 76 of the valve stem and a nut 77 threaded on the valve stem, washer 72 being placed between annulus 60 and the nut 77, washer 73 between annuli 60 and 61, washer 74 between annuli 61 and 62, and washer 75 between annulus 62 and valve stem head 76. The apertures 68, 69, 70 are large enough to permit the annuli to be shifted laterally on the valve stem with relation to each other and the soft rubber washers permit such shifting while sealing the apertures.

A ring 78 is secured as by welding to the annulus 60 about the aperture therein and receives within it the upper portion 80 of the nut 77. A thimble extension 79 of the nut 77 loosely surrounds the valve stem so as to provide hollow shank portions 81 adapted to engage in a slot in the rim to key the bead locking ring to the rim and relieve the valve stem 71 from shearing stress.

Referring to Figs. 9 to 12 inclusive, these illustrate an embodiment of the invention in which the bead locking and sealing ring is formed of a plurality of metal strips 90, 91, 92 arranged in superimposed relation and bent circumferentially to permit overlapping their ends, as at 93, where they are secured together, as by bolts 94, 95 and a valve stem 96 passing through aligned apertures in their ends. The strips 90, 91, 92 are of gradually increasing width radially outwardly and each has rounded edges for sealing against the inner faces of the bead portions of the tire casing, and these rounded edges may be provided by folding the material of the strips on themselves, if desired, as in the construction of the annuli of Figs. 1 to 8 previously described.

The innermost strip 90 and the outermost strip 92 are corrugated transversely throughout their lengths, except at their overlapping ends, to provide additional lateral stiffness and stability against tipping. The middle strip 91 may be plain but is supported by contact of the corrugations of the other strips with which it contacts. At the position where the ends of the strips overlap, the ends of the strips 90, 91, and 92 are flattened, superimposed, and welded, brazed or soldered to provide an air-tight joint at each end of the band. These connected ends are apertured as at 97 to receive the valve stem, and at 98, 99 to receive bolts. A rubber gasket 100 is clamped between the two ends of the band and a raised bead 101 may be formed on each face of the ends contacting the gasket to hold it securely in place. When bolts 94, 95 are tightened and the valve stem is in place the gasket 100 is compressed sufficiently to expand laterally and seal against the bead portions of the tire. The arrangement is such that the valve and bolts may be removed and the ends of the bead lock moved past each other in a direction to reduce its circumference for removing it from or placing it within the tire casing. The strips 90, 91, 92 are free to move laterally with respect to each other except at the overlapped ends at the valve stem. Lugs 102, which may be stamped from the metal of the innermost band or welded or otherwise secured thereto provide the desired spacing of the ring from the rim. A plate 103, apertured to receive bolts 94, 95, has lugs 104 adapted to be received in the valve stem aperture in the rim for relieving the valve stem of driving forces.

The overlapped end construction may be used if desired for additional adjustment in mounting and dismounting but is not ordinarily necessary as good results are obtained when the strips 90, 91, 92 are endless, due to the flexibility of the strips. While the overlapping bolted end construction has been shown in connection with the bead locking ring having two laterally corrugated annuli and an interposed plain annulus such overlapped construction may also be used with other ring constructions, such as those hereinabove and hereinafter described.

Referring to Figs. 13 and 14 of the drawings, these show an annular bead locking ring of thin metal strips 110, 111, 112 superimposed upon each other. The middle strip 111 is laterally corrugated and the inner strip 110 and outer strip 112, which may be plain, are properly spaced by the corrugations. Each of the strips has rounded edges for sealing engagement with the bead portions of the tire and for this purpose there they may have marginal portions folded upon themselves as hereinabove described. The strips may be made endless, as the laminated construction of the ring and the thinness of the strips permits distortion of the bead lock to enter it between the bead portions of a tire casing or to remove it therefrom. When desired, however, the strips may be united and secured at ends thereof and the ends overlapped and secured by bolts after the manner shown in Figs. 9 to 12 to provide for additional distortion of the bead lock for entering it in or removing it from a tire.

For spacing the bead locking ring from the rim and to raise its sealing edges above the toes of the beads of the tire casing, spacing blocks 113 may be secured to or formed on the strip 110 as by embossing the strip to form such spacing elements.

The form of the invention shown in Fig. 15 provides a plurality of superimposed annular bands 120, 121, 122 formed with stiffening and supporting projections in off-set relation to cooperate with flat portions on the adjacent band. Band 122 is formed with embossed projections 123, 124 whereby it is spaced from band 121. Band 121 is similarly formed with embossed projections 125, 126 whereby it is held in spaced relation to band 120. Band 120 is formed with projections 127, 128 whereby it is spaced from the rim. The bands are of graduated widths, band 122 being the widest so as to fit between the sloping wall of the bead portions of a tire casing under substantially equal compression. At the valve position the bands are held together by the valve stem in the manner shown in Fig. 8, spacing and sealing washers being used to hold the bands in spaced-apart relation and to seal the valve stem holes in the bands. At other positions the bands are free to float laterally upon each other. The rounded edges of the bands provide three pairs of annular sealing faces for contact with the bead portions of the tire casing.

Referring to Fig. 16, this shows an embodiment of the invention in which a single band 130 of sheet metal has marginal portions 131, 132 folded back and forth upon each other in accordion pleats to provide a plurality of rounded sealing faces 133, 134, 135 along one margin for sealing engagement with the bead portions of a tire casing, and spaced sealing faces 136, 137, 138 at the other margin thereof. Sealing faces 133, 138 are farther apart than sealing faces 135, 136 so as to be forced against the sloping faces of the bead portions of the tire casing with equal sealing pressure. The band is made endless to provide continuously annular sealing faces. When made of sufficiently light metal construction it may be distorted sufficiently to permit placement in and removal from a tire casing. A valve stem 139 is clamped to the band at an opening provided therefor and is sealed against the band by a rubber washer 140 so that no inner tube is required. When, however, an inner tube is desired its valve may be passed through the valve aperture in the bead locking ring. The valve stem may be relieved of stress by means of a nut and ring construction like 77 and 78 of Fig. 8.

In the rim lock of applicant's invention a plurality of annular sealing faces of narrow width and of rounded face are presented for engagement with each bead portion of the tire thereby providing a sealed tire cavity which may be inflated without the use of an inner tube, especially when the bead portions have a rubber inner face for contact therewith. Such an arrangement reduces the thickness of rubber material and thereby reduces the temperature of the tire during use resulting in longer tire life. The floating arrangement of the bands equalizes pressure and facilitates distortion of the ring for introducing it into the tire casing, and the graduated width of the bands seals the bands at different elevations along the casing. Forces applied to close the circumferentially split rim are effective in sealing the tire cavity as nosing or penetration of the locking ring into the material of the bead portions of the casing takes place, the pressure being distributed over a small area.

In all the embodiments hereinabove described use of the locking ring with or without an inner tube is possible. Use, without an inner tube has the advantage, in addition to those of economy of materials and longer life hereinabove discussed, that the danger is eliminated of explosive accidents upon separating the split rim without first deflating the tire, the air leakage upon release of the clamping pressure in the case of the tire with no inner tube serving as a safety measure to avoid sudden expansion and burst of an inner tube.

Variations may be made without departing from the invention as it is defined by the following claims.

I claim:

1. A ring for locking the bead portions of a pneumatic tire upon a rim, said ring comprising a circumferentially continuous and flexible band of sheet metal folded closely upon itself at its margins providing thin rounded edges for exerting pressure against the bead portions of the casing, said band having depressed portions stiffening the band laterally while permitting circumferential flexibility thereof.

2. A locking ring for the bead portions of a pneumatic tire casing, said ring comprising a plurality of radially superimposed, laterally stiff bands circumferentially relatively flexible independently of one another, each of said bands having edges for exerting pressure against the bead portions of the casing, and means for maintaining said bands in radially spaced-apart relation.

3. A locking ring as defined in claim 2 in which the spacing means comprises depressed portions in at least one of the bands engageable with an adjacent band.

4. A locking ring as defined in claim 2 in which a band disposed radially outward is of greater width than a band disposed radially inward thereof.

5. A locking ring for the bead portions of a pneumatic tire casing, said ring comprising a plurality of radially superimposed, laterally stiff, open-ended bands each having edges for exerting pressure against the bead portions of the casing, means for maintaining said bands in radially spaced-apart relation intermediate the ends thereof, and means for connecting the ends of said bands to provide circumferential continuity of the side surfaces of the ring.

6. A locking ring for the bead portions of a pneumatic tire casing, said ring comprising a plurality of radially superimposed, laterally stiff bands circumferentially relatively flexible independently of one another, each of said bands having edges for exerting pressure against the bead portions of the casing, and means connecting said bands while permitting relative lateral adjusting movement of the bands.

7. A locking ring for the bead portions of a pneumatic tire casing, said ring comprising a plurality of radially superimposed, laterally stiff bands circumferentially relatively flexible independently of one another, each band being folded closely upon itself at its margins providing thin rounded edges for exerting pressure against the bead portions of the casing.

8. A ring for locking the bead portions of a pneumatic tire casing upon a rim having an aperture for a valve stem, said ring comprising a laterally stiff and circumferentially relatively flexible band having edges for exerting pressure against the bead portions of the casing, said band having an aperture therein for passage of a valve stem, and means comprising a hollow member around the valve stem aperture of said band and engageable in the aperture of the rim and with said band adjacent the aperture therein for resisting relative rotational movement of said ring and the rim, said valve stem being secured to said ring independently of said hollow member.

9. A ring for locking the bead portions of a pneumatic tire casing upon a rim having an aperture for a valve stem, said ring comprising a plurality of laterally stiff bands of sheet metal circumferentially relatively flexible independently of one another and each being folded closely upon itself at its margins to provide thin rounded edges for exerting pressure against the bead portions of the casing, means comprising depressed portions in the sheet metal maintaining said bands in radially spaced-apart relation and for spacing the ring from the floor of said rim, said bands having aligned valve stem apertures, means connecting said bands at said apertures while permitting relative adjusting movement of said bands, a valve stem, and means other than said valve stem at said apertures cooperable with the apertured portion of the rim for resisting relative circumferential movement of said ring and the rim.

10. Means for securing a pneumatic tire casing having spaced-apart bead portions to a rim, said means comprising a circumferentially flexible band formed with laterally extending corrugations and having smooth rounded margins for exerting pressure against the bead portions of the casing, said corrugations being spaced apart circumferentially of the band permitting circumferential flexibility thereof while increasing the lateral stiffness of the band.

11. Means for securing a pneumatic tire casing having spaced-apart bead portions to a rim, said means comprising a plurality of annular metal bands arranged concentrically for engagement between said bead portions, said bands having spacing means for supporting them in radially spaced-apart relation, each band having narrow blunt margins continuous circumferentially for exerting pressure against the bead portions of the casing to maintain air-tight seals along the same, at least one of said bands having laterally extending corrugations, spaced apart circumferentially of the band permitting circumferential flexibility thereof while increasing the lateral stiffness of the band.

12. A locking ring for the bead portions of a pneumatic tire casing, said ring comprising a plurality of radially superimposed, laterally stiff, open-ended bands each having thin edges for exerting pressure against the bead portions of the casing with the ends of the ring overlapping at the ends of the bands, means for maintaining said bands in radially spaced-apart relation intermediate the ends thereof, and means for connecting the ends of the bands to provide circumferential continuity of the ring, said connecting means comprising a resilient gasket between the ends of the ring extending to the edges of the ring providing circumferential continuity of the edges of the ring to provide air-tight seals with the bead portions of the casing.

13. A locking ring for the bead portions of a pneumatic tire casing insertable between said bead portions by flexure of the ring circumferentially to reduce temporarily its effective diameter, said ring comprising a laterally stiff and circumferentially continuous and relatively flexible band having an intermediate portion extending substantially directly from margin to margin and said band being folded closely upon itself at its margins providing thin rounded edges extending laterally substantially directly from said intermediate portion for exerting pressure against the bead portions of the casing.

14. A continuously annular locking and sealing ring for the bead portions of a pneumatic tire casing insertable between said bead portions by flexure of the ring circumferentially to reduce temporarily its effective diameter, said ring comprising a laterally stiff and circumferentially relatively flexible and continuous band having an intermediate portion extending substantially directly from margin to margin and said band being folded closely upon itself at its margins providing thin rounded edges extending laterally substantially directly from said intermediate portion for providing air-tight seals with the bead portions of the casing.

15. A locking ring for the bead portions of a pneumatic tire casing, said ring comprising a plurality of radially superimposed bands circumferentially flexible independently of one another to reduce temporarily the effective diameter for inserting the ring between said bead portions, each of said bands having edges for exerting pressure against the bead portions of the casing, inflating means extending radially through said bands, and resilient means for connecting said inflating means to at least some of said bands.

16. A locking ring for the bead portions of a pneumatic tire casing, said ring comprising a plurality of radially superimposed bands circumferentially flexible independently of one another to reduce temporarily the effective diameter for inserting the ring between said bead portions, each of said bands having edges for exerting pressure against the bead portions of the casing, and means connecting said bands at a single circumferential position of the ring.

17. A locking ring for the bead portions of a pneumatic tire casing, said ring comprising a plurality of radially superimposed bands circumferentially flexible independently of one another to reduce temporarily the effective diameter for inserting the ring between said bead portions, each of said bands having edges for exerting pressure against the bead portions of the casing, and means connecting said bands at a single circumferential position of the ring, the connecting means comprising resilient means permitting relative lateral adjusting movement of the bands.

FRANK HERZEGH.